(12) United States Patent
Voss et al.

(10) Patent No.: US 8,955,803 B2
(45) Date of Patent: Feb. 17, 2015

(54) DECOMPRESSION ASSEMBLY FOR AN AIRCRAFT

(75) Inventors: Jens Voss, Harsefeld (DE); Patrique Doemeland, Hamburg (DE); Ingo Roth, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 515 days.

(21) Appl. No.: 13/203,410

(22) PCT Filed: Mar. 3, 2010

(86) PCT No.: PCT/EP2010/001320
§ 371 (c)(1),
(2), (4) Date: Nov. 1, 2011

(87) PCT Pub. No.: WO2010/099952
PCT Pub. Date: Sep. 10, 2010

(65) Prior Publication Data
US 2012/0043421 A1 Feb. 23, 2012

Related U.S. Application Data
(60) Provisional application No. 61/209,476, filed on Mar. 6, 2009.

(30) Foreign Application Priority Data
Mar. 6, 2009 (DE) .......................... 10 2009 012 015

(51) Int. Cl.
*B64D 11/00* (2006.01)
*B64D 13/00* (2006.01)
(Continued)

(52) U.S. Cl.
CPC .............. *B64C 1/18* (2013.01); *B64C 2001/009* (2013.01)
USPC .......... 244/118.5; 244/129.4; 454/70; 454/71

(58) Field of Classification Search
USPC .................. 244/118.5, 119, 129.1, 129.4; 454/70–76, 83–87
See application file for complete search history.

(56) References Cited

U.S. PATENT DOCUMENTS

| | | | | |
|---|---|---|---|---|
| 4,033,247 A | * | 7/1977 | Murphy | .......................... 454/76 |
| 4,269,376 A | * | 5/1981 | Haux et al. | ................ 244/117 R |

(Continued)

FOREIGN PATENT DOCUMENTS

| | | |
|---|---|---|
| CN | 101336191 | 3/2008 |
| DE | 10 2007 061 433 A1 | 7/2009 |

(Continued)

OTHER PUBLICATIONS

International Search Report, PCT/EP2010/001320, Airbus Operations GMBH, ISA/EP, Jun. 17, 2010.

(Continued)

*Primary Examiner* — Tien Dinh
*Assistant Examiner* — Michael A Fabula
(74) *Attorney, Agent, or Firm* — Krieg DeVault LLP

(57) ABSTRACT

A decompression assembly (10; 10') for an aircraft comprises a first cabin lining element (12; 12') having a boundary area (14; 14') and a second cabin lining element (20; 20') having a boundary area (22; 22'), wherein the boundary area (22; 22') of the second cabin lining element (20; 20') is disposed at a smaller distance from an aircraft outer skin (24; 24') than the boundary area (14; 14') of the first cabin lining element (12; 12'). An air discharge opening (28; 28') is disposed between the boundary area (14; 14') of the first cabin lining element (12; 12') and the boundary area (22; 22') of the second cabin lining element (20; 20') for discharging air from a cabin (18; 18') of the aircraft into an area (30; 30') of the aircraft located between the cabin lining elements (12, 20; 12', 20') and the aircraft outer skin (24; 24'). A decompression element (32; 32') is adapted to release a pressure compensation opening (36; 36') between the cabin (18; 18') of the aircraft and the area (30; 30') of the aircraft located between the cabin lining elements (12, 20; 12', 20') and the aircraft outer skin (24; 24') in the event of decompression and is disposed in an area of the aircraft that is shielded from an interior of the cabin (18; 18') of the aircraft by the first and/or the second cabin lining element (12, 20; 12', 20').

15 Claims, 6 Drawing Sheets

(51) Int. Cl.
*B64C 1/18* (2006.01)
*B64C 1/00* (2006.01)

(56) References Cited

U.S. PATENT DOCUMENTS

| | | | | |
|---|---|---|---|---|
| 4,383,666 | A | * | 5/1983 | Allerding et al. .......... 244/118.5 |
| 4,390,152 | A | * | 6/1983 | Jorgensen ................. 244/118.5 |
| 4,432,514 | A | | 2/1984 | Brandon |
| 4,646,993 | A | * | 3/1987 | Baetke ....................... 244/117 R |
| 4,703,908 | A | * | 11/1987 | Correge et al. ............ 244/118.5 |
| RE32,554 | E | * | 12/1987 | Murphy ...................... 244/118.5 |
| 5,118,053 | A | * | 6/1992 | Singh et al. ................ 244/118.5 |
| 5,759,659 | A | * | 6/1998 | Sanocki et al. .................. 428/74 |
| 5,779,193 | A | * | 7/1998 | Sloan ......................... 244/117 R |
| 5,871,178 | A | * | 2/1999 | Barnett et al. ............. 244/118.5 |
| 6,129,312 | A | * | 10/2000 | Weber ........................ 244/118.5 |
| 6,264,141 | B1 | | 7/2001 | Shim et al. |
| 7,624,732 | B2 | * | 12/2009 | Mitchell et al. .......... 128/202.24 |
| 8,201,775 | B2 | * | 6/2012 | Treimer et al. ............. 244/118.5 |
| 8,567,721 | B2 | * | 10/2013 | Voss et al. .................. 244/129.4 |
| 2008/0290217 | A1 | * | 11/2008 | Ghoreishi et al. ......... 244/129.4 |
| 2009/0159748 | A1 | | 6/2009 | Treimer et al. |
| 2009/0179110 | A1 | | 7/2009 | Leyens |
| 2010/0187358 | A1 | * | 7/2010 | Voss et al. .................. 244/129.4 |
| 2010/0320318 | A1 | * | 12/2010 | Roth et al. ................. 244/118.5 |
| 2011/0248117 | A1 | * | 10/2011 | Boock et al. ................... 244/1 N |
| 2012/0003908 | A1 | * | 1/2012 | Klimpel et al. ................ 454/76 |

FOREIGN PATENT DOCUMENTS

EP 0 260 348 A1 3/1988
WO WO 2007/073787 A1 7/2007

OTHER PUBLICATIONS

English language abstract of DE 10 2007 061 433 A1.

* cited by examiner

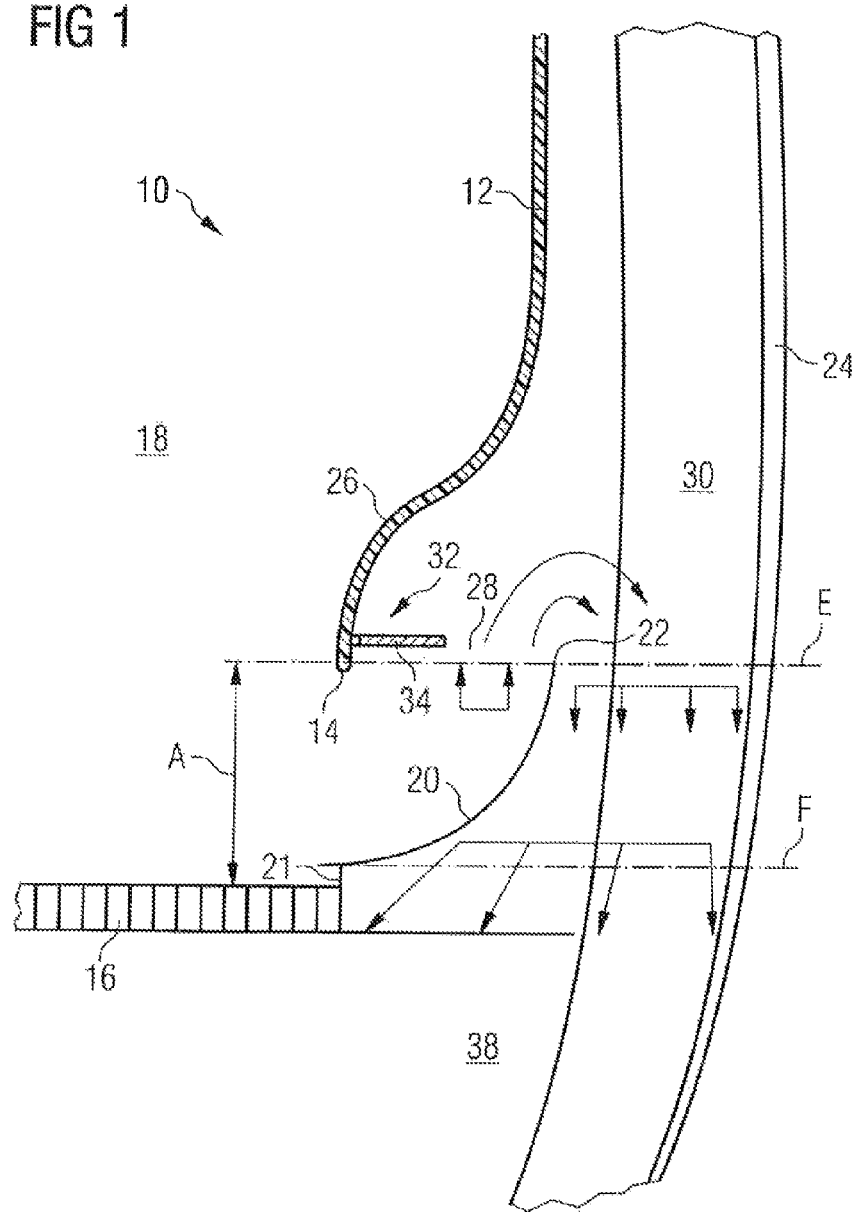

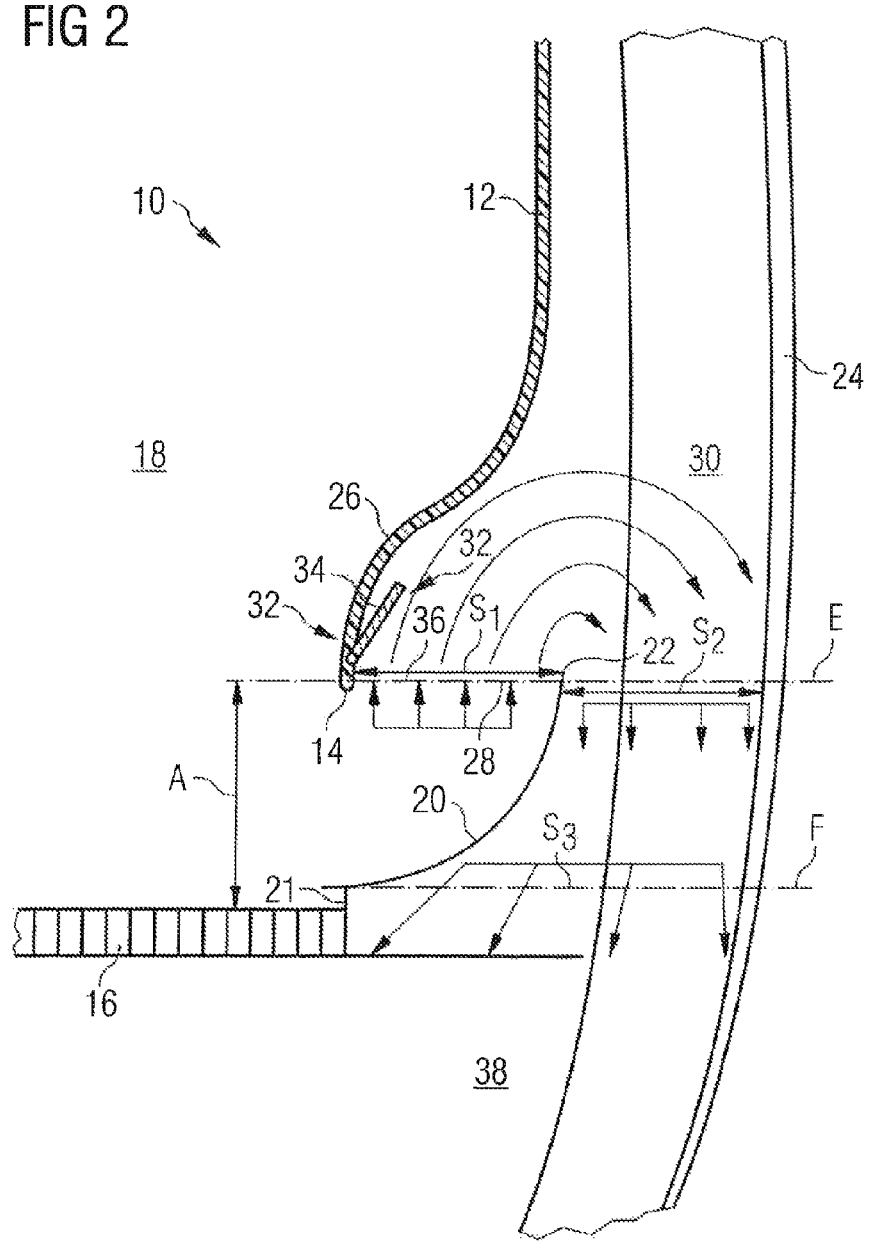

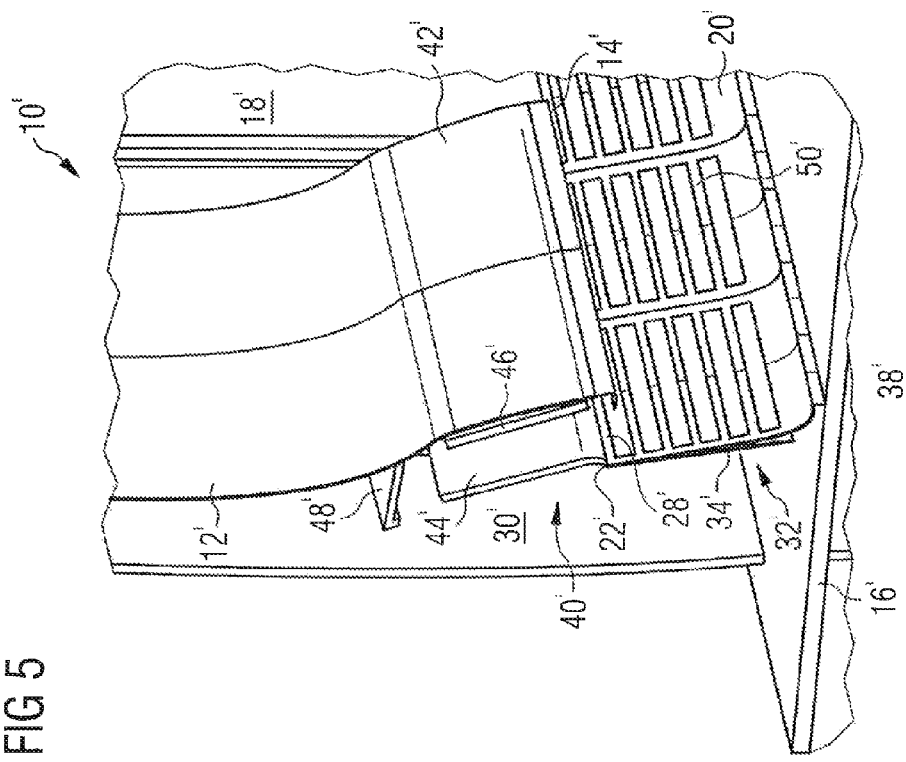
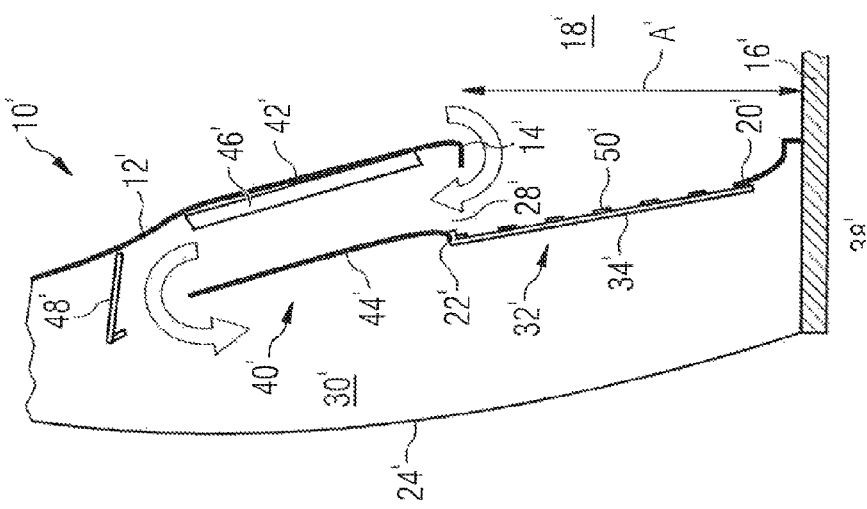

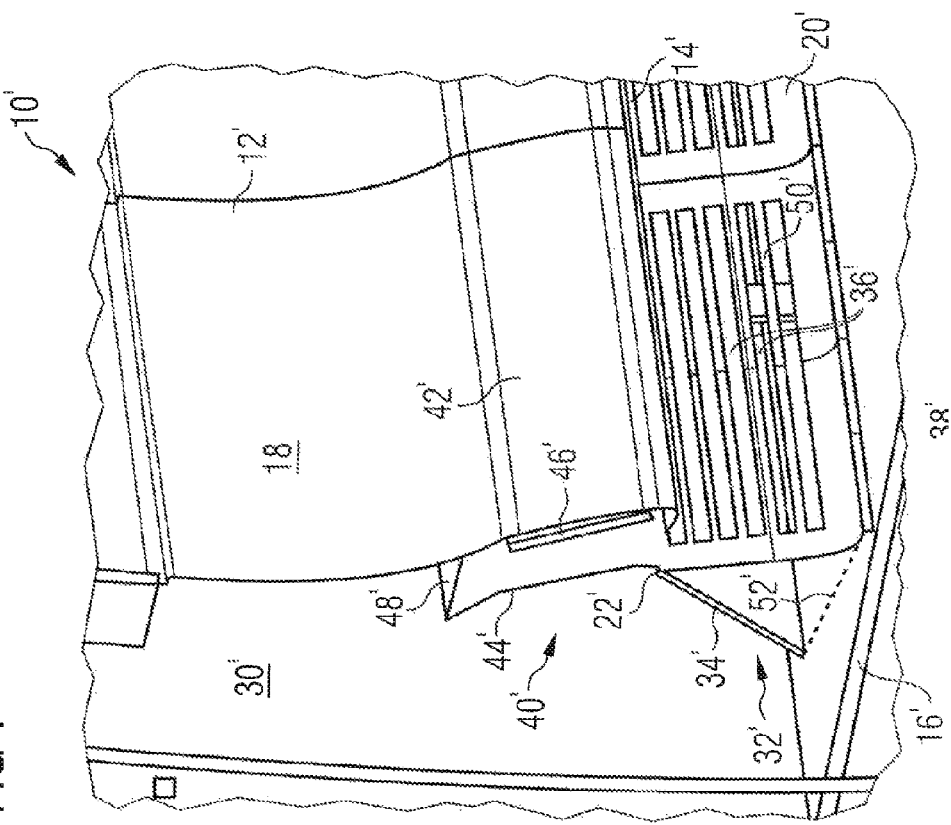
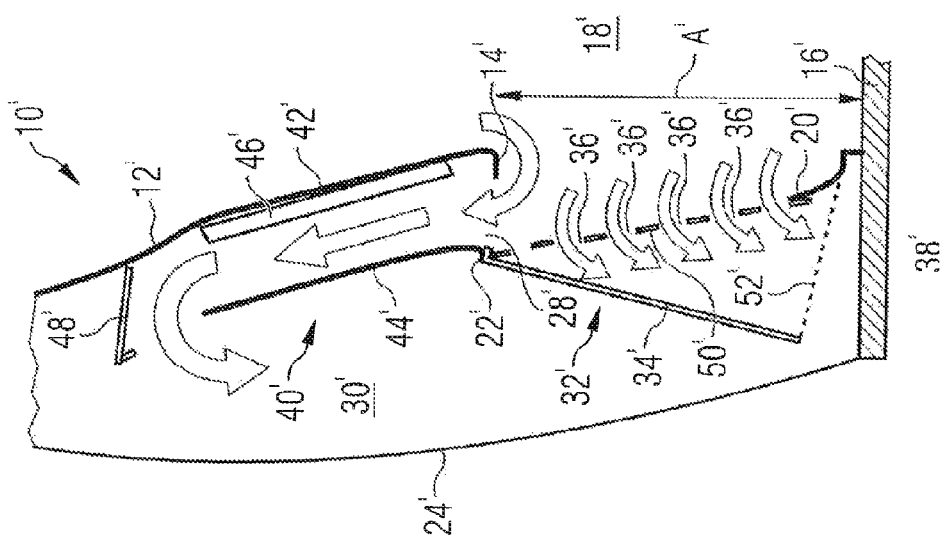

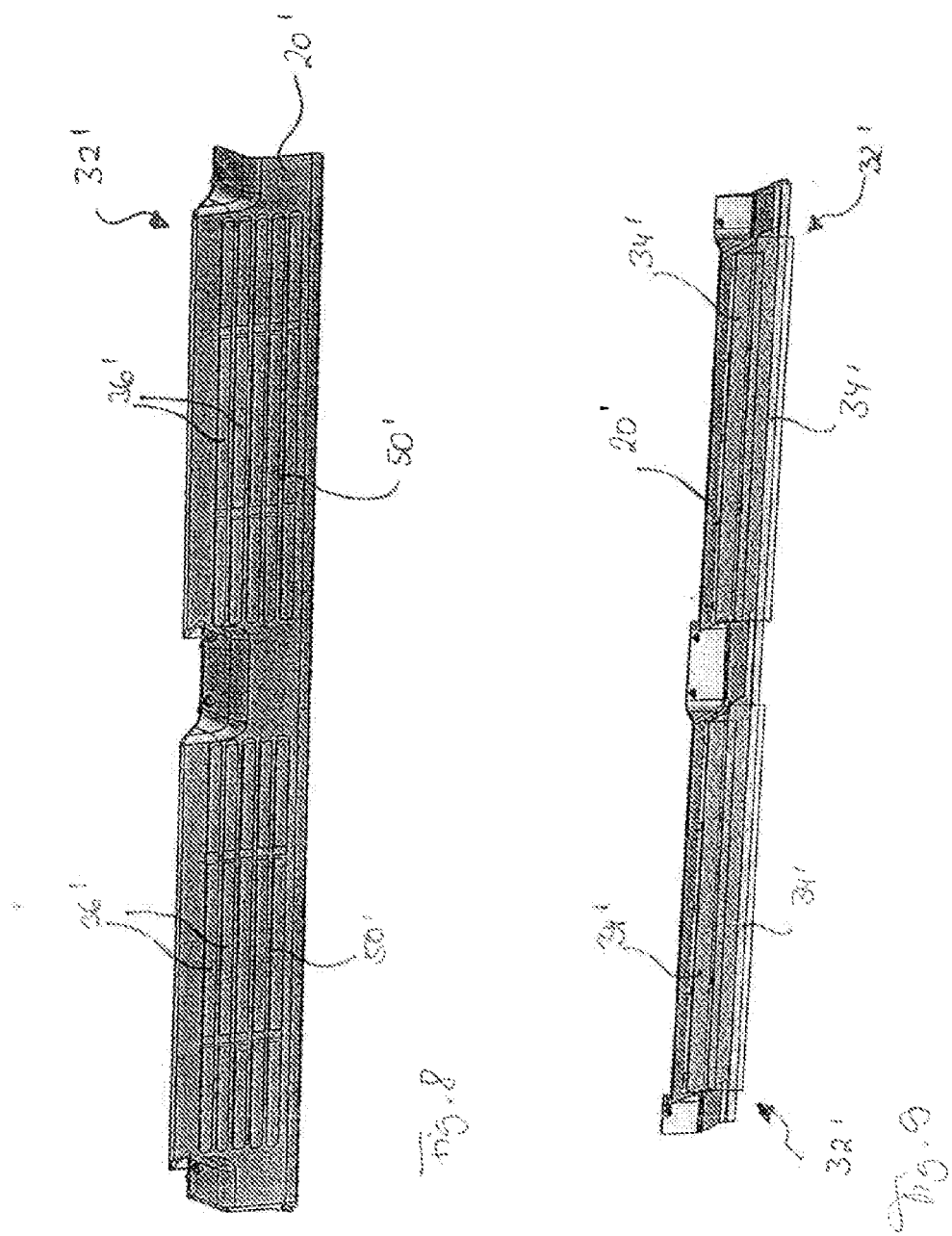

DECOMPRESSION ASSEMBLY FOR AN AIRCRAFT

CROSS REFERECE TO RELATED APPLICATIONS

The present application is a 0371 national stage patent application of PCT/EP2010/001320, filed Mar. 3, 2010, which claims the benefit of U.S. Provisional Application No. 61/209,476 filed Mar. 6, 2009 and claims priority to German Patent Application No. 10 2009 012 015.7 filed Mar. 6, 2009, each of which is incorporated herein by reference.

FIELD OF THE APPLICATION

The invention relates to a decompression assembly provided for use in an aircraft, for example a passenger aircraft.

BACKGROUND

Passenger aircraft currently in use comprise a pressurized cabin, the internal pressure of which while flying is maintained for example by means of an air conditioning system, which is supplied with air drawn from the engines, at a pressure level that is raised compared to the ambient pressure, i.e. the reduced atmospheric pressure at high altitudes. Generally the pressure in the interior of the cabin of a passenger aircraft while the aircraft is flying, i.e. when the aircraft is at cruising altitude, usually corresponds approximately to the atmospheric pressure at an altitude of 8000 ft (ca. 2400 m). The conditioning air supplied by the aircraft air conditioning system is conventionally fed into the cabin through air inlet ducts, which open out into the cabin above the passenger seats in the region of ceiling lining panels and/or side lining panels of the cabin lining. The exhaust air from the cabin is discharged as a rule through air outlet ducts, which are disposed in the region of a cabin floor or a portion of the side lining panels that is situated near the floor. In order in the event of decompression, i.e. in the event of a pressure drop in an area of the aircraft cabin that is maintained at a raised pressure during flying, to prevent damage to the cabin lining, in particular to the side lining panels, in a decompression situation a pressure compensation has to be possible between the area of the aircraft cabin that is affected by the decompression and an area that is delimited by the panels, in particular the side lining panels, of the cabin lining and the aircraft outer skin.

For example an air outlet duct, which during normal operation of the aircraft is used to discharge exhaust air from the cabin into the area delimited by the panels of the cabin lining and the aircraft outer skin and then for example into an underfloor area of the aircraft, may in the event of decompression provide for a pressure compensation between the area of the aircraft cabin that is affected by the decompression and the area that is delimited by the panels of the cabin lining and the aircraft outer skin. As the air outlet duct may then however not only be optimized with regard to its function as an exhaust air discharge duct during normal operation of the aircraft but has to be designed in such a way that in the event of decompression it enables a sufficiently rapid pressure compensation between the area of the aircraft cabin that is affected by the decompression and the area that is delimited by the panels of the cabin lining and the aircraft outer skin, an air outlet duct that is used both as an exhaust air discharge duct and as a pressure compensation duct usually has comparatively poor acoustic properties. This may lead to an impairment of the comfort of the passengers in the aircraft cabin.

As an alternative to this, aircraft cabin lining panels of the type described in the non-prior publication DE 10 2007 061 433 may be provided with a screen, through which during normal operation of the aircraft exhaust air from the cabin is conveyed into a recirculation air duct of an aircraft air conditioning system. Disposed in an area of the aircraft that is separated from the cabin by the screen is a decompression element having a flap, which in the event of decompression releases a pressure compensation opening between the cabin and an area that is delimited by cabin lining panels and an aircraft outer skin.

Finally it is known to equip aircraft cabin lining panels, such as for example dado panels, with an integrated flap mechanism, which in the event of decompression releases a pressure compensation opening between an area of the aircraft cabin that is affected by the decompression and an area that is delimited by the panels of the cabin lining and the aircraft outer skin.

These currently used assemblies however have the drawback that they are often subject to misuse loads, such as for example foot treads or the like, and therefore have to be of a relatively rugged design. This leads to unwanted additional weight and to a greater overall volume of the lining panels. The increased installation space requirement of the panels results in a reduction of the cabin width and hence has a direct adverse effect upon the comfort of the passengers in the aircraft cabin. Finally, lining panels equipped with a pressure compensation flap are of a relatively complicated and hence fault-prone and high-maintenance construction.

SUMMARY

The invention is geared to the object of providing a simply designed, lightweight decompression assembly for an aircraft, which in the event of a pressure drop in an area of an aircraft cabin that is maintained at a raised pressure during flying provides for a proper pressure compensation between the area of the aircraft cabin that is affected by the decompression and an area that is delimited by the panels of the cabin lining and the aircraft outer skin.

In order to achieve this object, a decompression assembly according to the invention for an aircraft comprises a first cabin lining element having a boundary area and a second cabin lining element having a boundary area. The boundary area of the second cabin lining element is disposed at a smaller distance from an aircraft outer skin than the boundary area of the first cabin lining element. Disposed between the boundary area of the first cabin lining element and the boundary area of the second cabin lining element is an air discharge opening, through which during normal operation of the aircraft air is discharged from the cabin of the aircraft into an area of the aircraft located between the cabin lining elements and the aircraft outer skin. The first cabin lining element may be for example a side lining panel, in particular a dado panel, the boundary area of which faces a floor of the aircraft cabin and extends along a longitudinal axis of the aircraft at a substantially constant distance from the floor of the aircraft cabin. The second cabin lining element may be for example a floor-delimiting element that extends from the floor of the aircraft cabin up towards the dado panel.

The boundary area of the second cabin lining element facing the first cabin lining element may extend along the longitudinal axis of the aircraft substantially parallel to the floor of the aircraft cabin and/or be disposed level with the boundary area of the first cabin lining element. Alternatively, the first and the second cabin lining element may however be shaped and/or arranged in such a way that the second cabin lining element engages behind the first cabin lining element, i.e. the boundary area of the second cabin lining element, viewed from an interior of the aircraft cabin, is positioned behind the first cabin lining element. Finally an arrangement is also conceivable, in which the boundary area of the second cabin lining element is disposed below the boundary area of the first cabin lining element, i.e. is spaced apart from the boundary area of the first cabin lining element also in a direction substantially parallel to the aircraft outer skin.

The air discharge opening disposed between the boundary areas of the first and the second cabin lining elements may have a cross-sectional area of flow that corresponds to a total area delimited by the boundary areas of the first and the second cabin lining element. Alternatively, the cross section of flow of the air discharge opening may be delimited by components that narrow the cross section of flow.

The decompression assembly according to the invention further comprises a decompression element, which is adapted, in the event of decompression, i.e. in the event of a pressure drop in an area of the aircraft cabin that is maintained at a raised pressure during flying, to release a pressure compensation opening between the area of the aircraft cabin that is affected by the decompression and the area of the aircraft that is located between the cabin lining elements and the aircraft outer skin. In other words, the decompression element is adapted, in the event of decompression, to release an additional pressure compensation opening so that the discharge of air from the aircraft cabin is no longer possible just through the air discharge opening but through both the air discharge opening and the pressure compensation opening. The decompression assembly according to the invention therefore enables a rapid pressure compensation between an area of the aircraft cabin that is affected by a decompression and the area of the aircraft that is located between the cabin lining elements and the aircraft outer skin. Thus, in the event of decompression damage to the floor structure is reliably prevented.

In the decompression assembly according to the invention the decompression element is disposed in an area of the aircraft that is shielded from an interior of the cabin of the aircraft by the first and/or the second cabin lining element. In other words, the decompression element of the decompression assembly according to the invention is positioned in such a way that it is protected by the first and/or the second cabin lining element from being directly accessible by passengers accommodated in the aircraft cabin. By virtue of the decompression element being disposed in an area that is shielded from the interior of the aircraft cabin by the first and/or the second cabin lining element, the decompression element may be reliably protected from misuse loads, such as for example foot treads or the like. The decompression element may therefore be of a less rugged and hence lighter-weight design. What is more, a simple design of the decompression element is possible, with the result that the decompression element is only slightly prone to faults and entails only a low maintenance outlay.

The first and/or the second cabin lining element are/is preferably shaped and arranged in such a way that the cabin width available for the passengers is maximized without adversely affecting the discharge of air from the aircraft cabin during normal operation of the aircraft or in the event of decompression. In other words, for the shaping and arrangement of the first and/or the second cabin lining element first the cross-sectional areas of flow that are required for a proper discharge of air from the aircraft cabin during normal operation of the aircraft and in the event of decompression may be defined for the flow duct, through which air is discharged from the aircraft cabin. In dependence upon these cross-sectional areas of flow the first and/or the second cabin lining element may then be shaped and arranged in such a way that the cabin width is maximized and hence the comfort of the passengers increased. In particular, the first and/or the second cabin lining element may be positioned at a distance from the aircraft outer skin that guarantees that the flow duct for the discharge of air from the aircraft cabin has a sufficiently large cross-sectional area of flow both during normal operation of the aircraft and in the event of decompression but is no greater than is absolutely necessary to fulfil this condition.

The second cabin lining element, viewed from the interior of the aircraft cabin, may moreover have a concavely curved contour. Such a shaping of the second cabin lining element is appropriate for example if the cross-sectional area of flow of a flow duct portion that is delimited by the second cabin lining element and the aircraft outer skin is narrowed in an area near the floor by a bearer of the aircraft structure. The—viewed from the interior of the aircraft cabin—concavely curved contour of the second cabin lining element is then preferably fashioned in such a way that the flow duct portion delimited by the second cabin lining element and the aircraft outer skin has substantially the same cross-sectional area of flow along its entire length.

In this way, an unimpeded discharge of air from the aircraft cabin both during normal operation of the aircraft and in the event of decompression is ensured. At the same time the shape of the second cabin lining element with due regard to the configuration of the aircraft structure enables an optimum utilization of the space available between the second cabin lining element and the aircraft outer skin as a flow duct for the air that is to be discharged from the aircraft cabin and therefore makes it possible to maximize the cabin width available for the passengers.

Alternatively or in addition thereto, an angle of inclination of the second cabin lining element relative to the floor of the aircraft cabin may also be selected in such a way that the flow duct portion delimited by the second cabin lining element and the aircraft outer skin has a desired cross-sectional area of flow along its entire length, while at the same time the cabin width available for the passengers is maximized.

The decompression element of the decompression assembly according to the invention may comprise at least one flap, which is pivotable about an axis and is adapted to release the pressure compensation opening between the cabin of the aircraft and the region of the aircraft located between the cabin lining elements and the aircraft outer skin when a predetermined differential pressure acts upon the decompression element. The decompression element may further comprise a hinge or some other suitable fastening device for the pivotable fastening of the flap.

Where desired or necessary, the decompression element may also comprise a plurality of flaps that are pivotable about an axis, wherein preferably each flap is devised to release a pressure compensation opening between the cabin of the aircraft and the area of the aircraft located between the cabin lining elements and the aircraft outer skin when a predetermined differential pressure acts upon the decompression element. Each flap may be pivotably fastened by means of a hinge or some other suitable fastening device. The flaps of the decompression element may be disposed side by side and/or one below the other.

The flap of the decompression element may be biased, for example by means of a spring, into its closed position, in which it closes the pressure compensation opening between the cabin of the aircraft and the area of the aircraft located between the cabin lining elements and the aircraft outer skin.

By suitable selection of the spring and/or of the spring action provided by the spring it is then easily possible to set the differential pressure, at which the flap in the event of decompression releases the pressure compensation opening between the cabin of the aircraft and the area of the aircraft located between the cabin lining elements and the aircraft outer skin.

Alternatively or in addition thereto, the flap of the decompression element may be made of a material that is elastically deformable in such a way that the pressure compensation opening between the cabin of the aircraft and the area of the aircraft located between the cabin lining elements and the aircraft outer skin is released by means of the elastic deformation of the flap when a predetermined differential pressure acts upon the decompression element. In other words, by virtue of a suitable choice of material for the flap of the decompression element it is likewise easily possible to set the predetermined differential pressure, at which the flap of the decompression element in the event of decompression releases the pressure compensation opening between the cabin of the aircraft and the area of the aircraft located between the cabin lining elements and the aircraft outer skin.

If the decompression element of the decompression assembly according to the invention comprises a plurality of flaps that are pivotable about an axis, each flap may be biased by a spring into its closed position, in which it closes the associated pressure compensation opening between the cabin of the aircraft and the area of the aircraft located between the cabin lining elements and the aircraft outer skin. In principle a single spring may be used to bias a plurality of flaps of the decompression element into their closed positions. Alternatively, however, an individual spring may be provided for each flap. The springs associated with the individual flaps may have the same spring force. In such an embodiment of the decompression element all of the flaps are opened as soon as a specific differential pressure acts upon the decompression element. An alternative possibility is however to associate with the individual flaps of the decompression element springs that apply different spring forces and consequently closing forces on the flaps. The springs may then be selected for example in such a way that only a first flap is opened when a first predetermined differential pressure acts upon the decompression element, whilst a second flap is additionally opened only when a greater, second predetermined differential pressure acts upon the decompression element.

Alternatively or in addition thereto, the flaps of a decompression element comprising a plurality of flaps may be made of a material that is elastically deformable in such a way that the pressure compensation opening between the cabin of the aircraft and the area of the aircraft located between the cabin lining elements and the aircraft outer skin is released by means of the elastic deformation of the flaps when a predetermined differential pressure acts upon the decompression element. The flaps may be made of the same material or of various materials that have the same elastic deformation properties. With such an assembly it is guaranteed that all of the flaps of the decompression element are opened as soon as a predetermined differential pressure acts upon the decompression element. As an alternative thereto, however, a configuration of the decompression element is conceivable, in which the flaps are made of different materials and/or of materials having different elastic deformation properties. With such an assembly, for example a first flap may be opened when a first differential pressure acts upon the decompression element. A second flap, which is made of a different material and/or of a material having different elastic deformation properties, may on the other hand be opened only when a second predetermined differential pressure, which is higher than the first predetermined differential pressure, acts upon the decompression element.

In an embodiment of the decompression assembly according to the invention the decompression element is adapted to release a pressure compensation opening that is disposed between the boundary areas of the cabin lining elements in the event of decompression. In this embodiment of the decompression assembly according to the invention the pressure compensation opening that is released by the decompression element in the event of decompression therefore extends level with the air discharge opening, through which during normal operation of the aircraft exhaust air is discharged from the aircraft cabin into the area of the aircraft located between the cabin lining elements and the aircraft outer skin. A decompression assembly designed in such a way is notable for a particularly simple and lightweight design because an additional pressure compensation opening does not have to be provided, rather in the event of decompression the pressure compensation between the aircraft cabin and the area of the aircraft located between the cabin lining elements and the aircraft outer skin may be realized by means of a "widening of the cross section of flow" of the air discharge opening.

In a decompression assembly designed in such a way the decompression element is preferably connected to the first cabin lining element at a side of the first cabin lining element facing away from the interior of the aircraft cabin. Alternatively thereto, the decompression element may be connected to the second cabin lining element at a side of the second cabin lining element facing towards the interior of the aircraft cabin. Finally, the decompression element may also be of a two-part construction, so that a first decompression element may be connected to the first cabin lining element at a side of the first cabin lining element facing away from the interior of the aircraft cabin and a second decompression element may be connected to the second cabin lining element at a side of the second cabin lining element facing towards the interior of the aircraft cabin.

In an alternative embodiment of the decompression assembly according to the invention, the second cabin lining element may comprise an integrated screen element that extends over at least part of the total area of the second cabin lining element. The second cabin lining element may then be of a particularly lightweight design.

The decompression element is then preferably connected to the second cabin lining element at a side of the second cabin lining element facing away from the interior of the aircraft cabin and is adapted, in the event of decompression, to release a plurality of pressure compensation openings, which are defined by the screen element integrated into the second cabin lining element. In the event of decompression, the discharge of air from the aircraft cabin is then possible both through the air discharge opening and through the pressure compensation openings that are defined by the screen element integrated into the second cabin lining element.

The decompression assembly according to the invention may further comprise a sound absorption duct that extends, in relation to the direction of the flow of air through the air discharge opening, downstream of the air discharge opening. By means of the sound absorption duct noises that arise during the discharge of air from the aircraft cabin through the air discharge opening may be effectively deadened. This has an advantageous effect on the comfort of persons accommodated in the aircraft cabin, such as for example passengers and crew members.

The sound absorption duct may be delimited by a portion of the first cabin lining element and by a sound absorption duct element disposed opposite the portion of the first cabin lining element. In such an arrangement the sound absorption duct is integrated in an installation space-saving manner into the area of the aircraft located between the first cabin lining element and the aircraft outer skin.

The sound absorption duct element may be configured so as to be integrated with the second cabin lining element, i.e. it may be formed by an area of the second cabin lining element that engages behind the first cabin lining element. Alternatively thereto, the sound absorption duct element may take the form of a separate component, which may however be connected to the second cabin lining element.

The sound absorption duct may at least in sections be lined with a sound-absorbing material, such as for example a sound-absorbing foam material.

The sound-absorbing material is preferably applied onto a surface of the first cabin lining element remote from the interior of the aircraft cabin. Such an arrangement enables effective sound insulation and is simultaneously notable for a particularly low weight.

Finally, the decompression assembly according to the invention may comprise a flow control element that is disposed, in relation to the direction of the flow of air through the air discharge opening, downstream of the air discharge opening. The flow control element may be disposed at a desired angle relative to the direction of the flow of air through the air discharge opening in order to deflect the air flow in a desired manner. The flow control element however preferably extends substantially at right angles to the direction of the flow of air through the air discharge opening and is therefore capable of deflecting the air flow through ca. 180° towards an underfloor area of the aircraft. For example the air control element may be positioned, in relation to the direction of the flow of air through the air discharge opening, downstream of the sound absorption duct and may be fastened to the first cabin lining element at a side of the first cabin lining element remote from the interior of the aircraft cabin.

BRIEF DESCRIPTION OF THE DRAWINGS

Two preferred embodiments of the decompression assembly according to the invention are now described in detail with reference to the accompanying diagrammatic drawings, which show FIG. 1 a cross-sectional view of a first embodiment of a decompression assembly for an aircraft during normal operation of the aircraft, FIG. 2 the decompression assembly according to FIG. 1 in the event of decompression, FIG. 3a a sectional view of the decompression assembly according to FIG. 1 in the plane E, FIG. 3b a sectional view of the decompression assembly according to FIG. 1 in the plane F, FIG. 4 a cross-sectional view of a second embodiment of a decompression assembly for an aircraft during normal operation of the aircraft, FIG. 5 a three-dimensional view of the decompression assembly according to FIG. 4, FIG. 6 the decompression assembly according to FIG. 4 in the event of decompression, FIG. 7 the decompression assembly according to FIG. 5 in the event of decompression, FIG. 8 a three-dimensional front view of an arrangement comprising a second cabin lining element and a decompression element that is suitable for use in a decompression assembly according to FIGS. 4 to 7, and FIG. 9 a three-dimensional rear view of the arrangement according to FIG. 8.

DETAILED DESCRIPTION

Figure 3A:
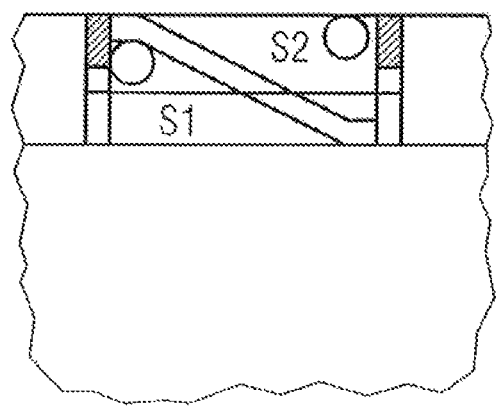
Figure 3B:
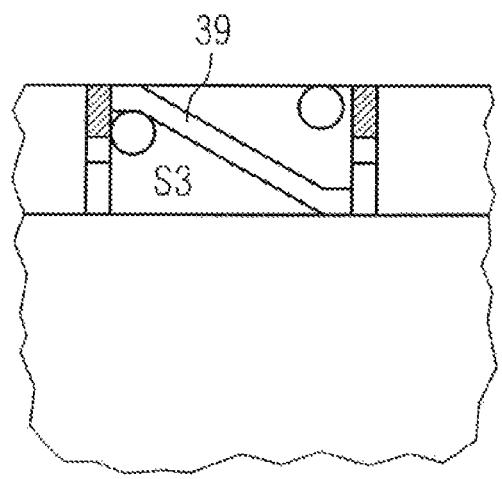

A decompression assembly 10 for use in an aircraft, in particular a passenger aircraft, is represented in FIGS. 1, 2, 3a and 3b and comprises a first cabin lining element 12 configured in the form of a dado panel. A boundary area 14 of the first cabin lining element 12 extends at a distance A, which is substantially constant along a longitudinal axis of the aircraft, from a floor 16 of an aircraft cabin 18. The decompression assembly 10 moreover comprises a second cabin lining element 20 configured in the form of a floor-delimiting element. The second cabin lining element 20, viewed from the interior of the aircraft cabin 18, has a concavely curved contour and extends from the floor 16 of the aircraft cabin 18 in the direction of the first cabin lining element 12. An edge 21 of the second cabin lining element 20 facing the interior of the aircraft cabin 18 serves as a fitting edge for a carpet that is to be laid on the floor 16 of the aircraft cabin 18.

In the embodiment of the decompression assembly 10 shown in FIGS. 1, 2, 3a and 3b, a boundary area 22 of the second cabin lining element 20 facing the first cabin lining element 12 and the boundary area 14 of the first cabin lining element 12 lie in a common plane E. It is however also conceivable for the first and the second cabin lining element 12, 20 to be arranged and/or shaped in such a way that the second cabin lining element 20 engages behind the first cabin lining element 12, so that the boundary area 22 of the second cabin lining element 20 lies in a plane that is disposed at a greater distance from the floor 16 of the aircraft cabin 18 than a plane, in which the boundary area 14 of the first cabin lining element 12 lies. Finally, it is equally conceivable for the first and the second cabin lining element 12, 20 to be shaped and/or arranged in such a way that a plane, in which the boundary area 22 of the second cabin lining element 20 lies, is disposed at a smaller distance from the floor 16 of the aircraft cabin 18 than a plane, in which the boundary area 14 of the first cabin lining element 12 lies.

The first and the second cabin lining element 12, 20 extend at least in sections substantially parallel to an aircraft outer skin 24. The boundary area 22 of the second cabin lining element 20 is however disposed at a smaller distance from the aircraft outer skin 24 than the boundary area 14 of the first cabin lining element 12. In the decompression assembly 10 represented in FIGS. 1, 2, 3a and 3b this is realized in that the first cabin lining element 12 is provided with a bulge 26 in an area facing the second cabin lining element 20.

Disposed between the boundary area 14 of the first cabin lining element 12 and the boundary area 22 of the second cabin lining element 20 is an air discharge opening 28, which during normal operation of the aircraft is used to discharge exhaust air from the aircraft cabin 18 into an area 30 of the aircraft that is located between the cabin lining elements 12, 20 and the aircraft outer skin 24. As is evident in particular from FIG. 1, the air discharge opening 28 however does not extend over the entire area delimited by the boundary areas 14, 22 of the cabin lining elements 12, 20. Instead, the cross section of flow of the air discharge opening 28 occupies only a sub-region of this area.

The decompression assembly 10 finally comprises a decompression element 32. The decompression element 32 comprises a flap 34 made of an elastically deformable material, such as for example a rubber material, which is fastened by means of a fastening device (not shown in detail) to the first cabin lining element 12 at a side of the first cabin lining element 12 facing away from the interior of the aircraft cabin 18. As an alternative thereto it would also be conceivable for the decompression element 32 and/or the flap 34 of the decompression element 32 to be fastened to the second cabin lining element 20 at a side of the second cabin lining element 20 facing towards the interior of the aircraft cabin 18. Finally, the decompression element 32 might also be of a two-part construction and comprise a first flap fastened to the first cabin lining element 12 as well as a second flap fastened to the second cabin lining element 20.

During the normal operation of the aircraft shown in FIG. 1, the flap 34 of the decompression element 32 is situated in its closed position so that the discharge of air from the aircraft cabin 18 is possible exclusively through the air discharge opening 28. In the event of a pressure drop in the aircraft cabin 18, however, a differential pressure acts upon the decompression element 32. However, if the differential pressure acting upon the decompression element 32 exceeds a predetermined value, which is determined by the deformation properties of the material used to manufacture the flap 34 of the decompression element 32, the flap 34 of the decompression element 32 swivels into its open position, which is shown in FIG. 2.

In its open position the flap 34 of the decompression element 32 releases a pressure compensation opening 36 between the aircraft cabin 18 and the area 30 of the aircraft located between the cabin lining elements 12, 20 and the aircraft outer skin 24. In the event of decompression air from the aircraft cabin 18 may flow unimpeded through the pressure compensation opening 36, which like the air discharge opening 28 extends between the boundary areas 14, 22 of the cabin lining elements 12, 20 in the plane E defined by the boundary areas 14, 22 of the cabin lining elements 12, 20, into the area 30 of the aircraft located between the cabin lining elements 12, 20 and the aircraft outer skin 24. Damage to the cabin lining elements 12, 20 may therefore be reliably prevented.

The decompression element 32, viewed from the interior of the aircraft cabin 18, is disposed behind the first cabin lining element 12 and hence in an area of the aircraft that is shielded from the interior of the aircraft cabin 18 by the first cabin lining element 12. The decompression element 32 is therefore not directly accessible from the interior of the aircraft cabin 18. As a result of this arrangement the decompression element 32 is well protected from misuse loads and may therefore be of a less rugged and hence lighter-weight design than a decompression element that is directly accessible from the interior of the aircraft cabin 18.

During normal operation of the aircraft, as well as in the event of decompression, an air flow that is discharged from the aircraft cabin 18 through the air discharge opening 28 or through the air discharge opening 28 and the pressure compensation opening 36 is deflected through 180° in the manner indicated by the arrows in FIGS. 1 and 2, so that the removal of the air flow in the direction of an underfloor area 38 of the aircraft is possible. In the decompression assembly 10 represented in FIGS. 1 and 2, the bulge 26 of the first cabin lining element 12 serves as a flow-guiding element for deflecting the air flow that is discharged from the aircraft cabin 18 through the air discharge opening 28 or through the air discharge opening 28 and the pressure compensation opening 36.

In the event of decompression a rapid discharge of air from the aircraft cabin 18 and hence an optimized pressure compensation between the aircraft cabin 18 and the area 30 of the aircraft located between the cabin lining elements 12, 20 and the aircraft outer skin 24 is enabled in that a cross-sectional area of flow S1 that is delimited by the boundary areas 14, 22 of the cabin lining elements 12, 20, i.e. is composed of the sum of the cross-sectional areas of flow of the air discharge opening 28 and the pressure compensation opening 36, corresponds substantially to a cross-sectional area of flow S2 that is delimited by the boundary area 22 of the second cabin lining element 20 and the aircraft outer skin 24. Downstream of the cross-sectional area of flow S2 the distance between the second cabin lining element 20 and the aircraft outer skin 24 increases as a result of the concavely curved contour of the second cabin lining element 20. As is evident in particular from the sectional views in FIGS. 3a and 3b, this means that a cross-sectional area of flow S3 that is restricted by a bearer element 39 of the aircraft structure may be designed in such a way that, despite the bearer element 39, it corresponds approximately to the cross sectional areas of flow S1 and S2. At the same time, the concavely curved contour of the second cabin lining element 20 allows a maximizing of the cabin width available for the passengers.

A second embodiment of a decompression assembly 10' provided for use in an aircraft is represented in FIGS. 4 to 7. Like the decompression assembly 10 represented in FIGS. 1, 2, 3a and 3b, the decompression assembly 10' according to FIGS. 4 to 7 also comprises a first cabin lining element 12' configured in the form of a dado panel and having a boundary area 14' that is disposed along a longitudinal axis of the aircraft at a substantially constant distance A' from a floor 16' of an aircraft cabin 18'. The decompression assembly 10' further comprises a second cabin lining element 20' configured in the form of a floor-delimiting element. A boundary area 22' of the second cabin lining element 20' facing the first cabin lining element 12' is disposed at a smaller distance from an aircraft outer skin 24' than the boundary area 14' of the first cabin lining element 12'.

During normal operation of the aircraft exhaust air from the aircraft cabin 18' is discharged through an air discharge opening 28', which is disposed between the boundary areas 14', 22' of the cabin lining elements 12', 20', into an area 30' of the aircraft located between the cabin lining elements 12', 20' and the aircraft outer skin 24'. As may best be seen in FIGS. 4 and 6, the air discharged from the aircraft cabin 18', after entering the air discharge opening 28', is conveyed first through a sound absorption duct 40' that extends, in relation to the direction of the flow of air through the air discharge opening 28', downstream of the air discharge opening 28'.

The sound absorption duct 40' is delimited by a portion 42' of the first cabin lining element 12' as well as by a sound absorption duct element 44' that is disposed opposite the portion 42' of the first cabin lining element 12'. The sound absorption duct element 44' is configured so as to be integrated with the second cabin lining element 20', i.e. viewed from the aircraft cabin 18' the sound absorption duct element 44' forms a portion of the second cabin lining element 20' that engages behind the first cabin lining element 12'. At a surface of the portion 42' of the first cabin lining element 12' facing away from the aircraft cabin 18' the sound absorption duct 40' is lined with a sound-absorbing material 46', such as for example a foam material. During normal operation of the aircraft the sound absorption duct 40' provides an effective damping of the noises arising during the discharge of exhaust air from the aircraft cabin 18' through the air discharge opening 28' and hence an increase of the comfort of persons accommodated in the aircraft cabin 18'.

After flowing through the sound absorption duct 40', the air flow that is discharged from the aircraft cabin 18' through the air discharge opening 28' is deflected through ca. 180°. For this purpose a flow control element 48' is provided downstream of the air discharge opening 28' and the sound absorption duct 40'. The flow control element 48' is configured in the form of a baffle plate and fastened to a surface of the first cabin lining element 12' remote from the aircraft cabin 18'. In order to bring about a proper deflection through ca. 180° of the air flow exiting from the sound absorption duct 40', the flow control element 48' extends substantially at right angles to the direction of the flow of air through the air discharge opening 28' and/or the sound absorption duct 40'. During normal operation of the aircraft the air flow deflected by the flow control element 48' is conveyed first through the area 30' of the aircraft located between the cabin lining elements 12', 20' and the aircraft outer skin 24' and is finally discharged from there into an underfloor area 38' of the aircraft.

As may best be seen in FIGS. 5 and 7, the second cabin lining element 20' comprises an integrated screen element 50'. At a side of the second cabin lining element 20' remote from the interior of the cabin 18' of the aircraft a decompression element 32' is connected to the second cabin lining element 20'. The decompression element 32' comprises a flap 34', which is pivotable about an axis. The decompression element 32' moreover comprises a hinge or some other suitable fastening device for the pivotable fastening of the flap 34' to the second cabin lining element 20'.

During normal operation of the aircraft the flap 34' of the decompression element 32' is biased by the force of a spring 52' into its closed position represented in FIGS. 3 and 4, in which it lies sealingly against the screen element 50' integrated into the second cabin lining element 20'. However, in the event of a pressure drop in the aircraft cabin 18' the flap 34' of the decompression element 32' is swiveled into an open position, which is represented in FIGS. 5 and 6, as soon as the differential pressure acting upon the decompression element 32' as a result of the pressure drop in the aircraft cabin 18' exceeds the spring biasing force applied by the spring 52'. By suitably designing the spring 52 it is therefore easily possible to set the predetermined differential pressure, from which the flap 34' of the decompression element 32' releases a plurality of pressure compensation openings 36', which are defined by the screen element 50' integrated into the second cabin lining element 20'.

In the event of decompression the discharge of air from the aircraft cabin 18' is therefore possible both through the air discharge opening 28' and through the pressure compensation openings 36'. This enables a rapid pressure compensation between the interior of the aircraft cabin 18' and the area 30' of the aircraft located between the cabin lining elements 12', 20' and the aircraft outer skin 24'. As a result, in the event of decompression damage to the floor structure is reliably prevented. The air that in the event of decompression is discharged from the interior of the aircraft cabin 18' through the air discharge opening 28' and the pressure compensation openings 36' is finally removed, just like during normal operation of the aircraft, into the underfloor area 38' of the aircraft.

The decompression element 32', viewed from the aircraft cabin 18', is disposed behind the second cabin lining element 20' and hence in an area of the aircraft that is shielded by the second cabin lining element 20' from the interior of the aircraft cabin 18' and hence from an area of the aircraft that is accessible to passengers. This arrangement guarantees that the decompression element 32' is well protected from misuse loads. The decompression element 32' may therefore be of a less rugged and hence simple and lightweight design. The shape and arrangement of the second cabin lining element 20' moreover make it possible to maximize the cabin width available for the passengers.

FIGS. 8 and 9 show an arrangement that comprises a second cabin lining element 20' and two decompression elements 32' and is suitable for use in a decompression assembly 10' according to FIGS. 4 to 7. In the arrangement represented in FIGS. 8 and 9, the second cabin lining element 20' in the state of installation in the aircraft cabin 18 extends over two frame compartments and comprises two integrated screen elements 50' constructed independently of one another. A decompression element 32' is associated with each screen element 50'. The decompression elements 32' comprise in each case two flaps 34' that are disposed one above the other and are pivotable about an axis. The flaps 34' are mounted in a rotary bearing and biased by means of a spring into their closed position, in which they lie sealingly against the screen elements 50' integrated into the second cabin lining element 20'. In the embodiment shown in FIGS. 8 and 9, the springs associated with the flaps 34' are selected in such a way that the flaps 34' are swiveled into their open position and release the pressure compensation openings 36' defined by the screen elements 50' integrated into the second cabin lining element 20' when a predetermined differential pressure acts upon the decompression elements 32'. In other words, the flaps 34' release all of the pressure compensation openings 36' simultaneously when a predetermined differential pressure acts upon the decompression elements 32'.

As an alternative thereto it is also possible to associate with the individual flaps 34' springs that have different spring forces and therefore apply different closing forces onto the flaps 34'. The springs may be for example dimensioned in such a way that only one flap 34' or the two top flaps 34' are opened when a first predetermined differential pressure acts upon the decompression elements 32'. The springs associated with the bottom flaps 34', on the other hand, may be dimensioned in such a way that they release the pressure compensation openings 36' associated with them only when the decompression elements 32' are subjected to a second predetermined differential pressure that is higher than the first predetermined differential pressure.

It goes without saying that features that are described here only in connection with a specific embodiment of a decompression assembly 10, 10' may be realized also in the other embodiment of a decompression assembly 10, 10' that is likewise described here. Thus, the decompression assembly 10 shown in FIGS. 1, 2, 3a and 3b may for example, like the decompression assembly 10' represented in FIGS. 4 to 7, be provided with a sound absorption duct. It is moreover conceivable to provide a decompression assembly with a plurality of decompression elements, wherein a first decompression element, just like the decompression element of the decompression assembly 10 represented in FIGS. 1, 2, 3a and 3b, may be adapted, in the event of decompression, to release a pressure compensation opening that extends between the boundary areas of the cabin lining elements. A second decompression element of the decompression assembly may on the other hand, just like the decompression element of the decompression assembly 10' represented in FIGS. 4 to 7, be adapted, in the event of decompression, to release a plurality of pressure compensation openings that are defined by a screen element integrated into a second cabin lining element.

The invention claimed is:

1. Decompression assembly for an aircraft, comprising:
 a first cabin lining element extending downwardly toward a floor of a cabin of the aircraft and having a lower boundary,
 a second cabin lining element extending upwardly from the floor in the direction of the first cabin lining element and having an upper boundary, wherein the upper boundary of the second cabin lining element is disposed at a smaller distance from an aircraft outer skin than the lower boundary of the first cabin lining element so that, viewed from the cabin, the upper boundary of the second cabin lining element is positioned behind the lower boundary of the first cabin lining element, an air discharge opening disposed between the lower boundary of the first cabin lining element and the upper boundary of the second cabin lining element for discharging air from a cabin of the aircraft into an area of the aircraft located between the cabin lining elements and the aircraft outer skin, and a decompression element, which is adapted to release a pressure compensation opening between the cabin of the aircraft and the area of the aircraft located between the cabin lining elements and the aircraft outer skin in the event of decompression, wherein the air decompression element is disposed in an area of the aircraft that is shielded from an interior of the cabin of the aircraft by the first and/or the second cabin lining element.

2. Decompression assembly according to claim 1, characterized in that the decompression element comprises at least one flap, which is pivotable about an axis and is adapted to release the pressure compensation opening between the cabin of the aircraft and the area of the aircraft located between the cabin lining elements and the aircraft outer skin when a predetermined differential pressure acts upon the decompression element.

3. Decompression assembly according to claim 2, characterized in that the flap of the decompression element is biased by means of a spring into its closed position, in which it closes the pressure compensation opening between the cabin of the aircraft and the area of the aircraft located between the cabin lining elements and the aircraft outer skin.

4. Decompression assembly according to claim 2, characterized in that the flap of the decompression element is made of a material that is elastically deformable in such a way that the pressure compensation opening between the cabin of the aircraft and the area of the aircraft located between the cabin lining elements and the aircraft outer skin is released by means of the elastic deformation of the flap when a predetermined differential pressure acts upon the decompression element.

5. Decompression assembly according to claim 1, characterized in that the decompression element is adapted to release a pressure compensation opening that extends between the boundaries of the cabin lining elements in the event of decompression.

6. Decompression assembly according to claim 1, characterized in that the decompression element is connected to the first cabin lining element at a side of the first cabin lining element facing away from the interior of the cabin of the aircraft or is connected to the second cabin lining element at a side of the second cabin lining element facing towards the interior of the cabin of the aircraft.

7. Decompression assembly according to claim 1, characterized in that the second cabin lining element comprises an integrated screen element that extends over at least part of the total area of the second cabin lining element.

8. Decompression assembly according to claim 7, characterized in that the decompression element is connected to the second cabin lining element at a side of the second cabin lining element facing away from the interior of the cabin of the aircraft and is adapted to release a plurality of pressure compensation openings, which are defined by the screen element integrated into the second cabin lining element in the event of decompression.

9. Decompression assembly according to claim 1, characterized by a sound absorption duct that extends, in relation to the direction of the flow of air through the air discharge opening, downstream of the air discharge opening.

10. Decompression assembly according to claim 9, characterized in that the sound absorption duct is delimited by a portion of the first cabin lining element and by a sound absorption duct element that is disposed opposite the portion of the first cabin lining element.

11. Decompression assembly according to claim 10, characterized in that the sound absorption duct element is configured so as to be integrated with the second cabin lining element or is connected to the second cabin lining element.

12. Decompression assembly according of claim 9, characterized in that the sound absorption duct is at least in sections lined with a sound-absorbing material.

13. Decompression assembly according to claim 1, characterized by a flow control element that is disposed, in relation to the direction of the flow of air through the air discharge opening, downstream of the air discharge opening and extends substantially at right angles to the direction of the flow of air through the air discharge opening.

14. Decompression assembly according to claim 1, wherein the decompression element is pivotably carried by at least one of the first and second cabin lining elements.

15. Decompression assembly according to claim 1, wherein the lower boundary of the first cabin lining element is spaced above the floor.

* * * * *